US008595692B2

(12) United States Patent
Kalagananam et al.

(10) Patent No.: US 8,595,692 B2
(45) Date of Patent: Nov. 26, 2013

(54) IDENTIFYING LOCK GRANULARIZATION OPPORTUNITIES

(75) Inventors: Aruna A. Kalagananam, Bangalore (IN); Venkataraghavan Lakshminarayanachar, Bangalore (IN); Prashanth K. Nageshappa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 12/728,407

(22) Filed: Mar. 22, 2010

(65) Prior Publication Data

US 2011/0231814 A1    Sep. 22, 2011

(51) Int. Cl.
G06F 9/44    (2006.01)

(52) U.S. Cl.
USPC ........................................................... 717/107

(58) Field of Classification Search
None
See application file for complete search history.

(56) References Cited

U.S. PATENT DOCUMENTS

| 6,496,909 | B1 * | 12/2002 | Schimmel | 711/163 |
|---|---|---|---|---|
| 6,594,683 | B1 | 7/2003 | Furlani et al. | |
| 7,120,762 | B2 | 10/2006 | Rajwar et al. | |
| 7,209,918 | B2 | 4/2007 | Li | |
| 7,231,498 | B2 | 6/2007 | Rodeheffer et al. | |
| 7,246,187 | B1 * | 7/2007 | Ezra et al. | 710/200 |
| 7,469,403 | B2 | 12/2008 | Choi et al. | |
| 7,516,313 | B2 | 4/2009 | Saha et al. | |
| 7,516,446 | B2 * | 4/2009 | Choi et al. | 717/128 |
| 7,549,150 | B2 | 6/2009 | Yu | |
| 7,577,657 | B2 | 8/2009 | Earhart | |
| 8,037,476 | B1 * | 10/2011 | Shavit et al. | 718/104 |
| 8,261,024 | B1 * | 9/2012 | Shavit et al. | 711/147 |
| 2005/0198626 | A1 * | 9/2005 | Kielstra et al. | 717/156 |
| 2007/0185872 | A1 * | 8/2007 | Ho et al. | 707/8 |
| 2008/0040560 | A1 | 2/2008 | Hall et al. | |
| 2008/0059471 | A1 * | 3/2008 | Loaiza et al. | 707/8 |
| 2008/0276256 | A1 * | 11/2008 | Ogasawara et al. | 719/320 |
| 2009/0044174 | A1 * | 2/2009 | Dolby et al. | 717/127 |
| 2009/0125882 | A1 | 5/2009 | Frigo et al. | |
| 2010/0122253 | A1 * | 5/2010 | McCart | 718/100 |
| 2011/0022893 | A1 * | 1/2011 | Yang et al. | 714/33 |

OTHER PUBLICATIONS

Zhang, Yaun et al.; "Minimum Lock Assignment: A Method for Exploiting Concurrency Among Critical Sections"; Lecture Notes in Computer Science, v 5335 LNCS, pp. 141-155, 2008; Languages and Compilers for Parallel Computing—21st International Workshop, LCPC 2008; Springer Verlag; http://www.cs.ualberta.ca/~amaral/LCPC08-prelim-prog/papers/Zhang.pdf.

* cited by examiner

*Primary Examiner* — Wei Zhen
*Assistant Examiner* — Adam R Banes
(74) *Attorney, Agent, or Firm* — A. Bruce Clay

(57) ABSTRACT

Lock granularization opportunities are identified in computer code. A processor is used to generate synchronized code blocks and fields (data) accessed in each code block. Each of the code blocks can then be represented by a set. A list of non-intersecting synchronized code blocks having no commonly accessed fields is generated, and a list of intersecting synchronized code blocks (code blocks each having at least one commonly accessed field) is also generated. Equal and superset-subset lists are then generated from the list of intersecting synchronized code blocks. Granularized locks are applied directly around the fields that are accessed within code blocks represented by non-intersecting and equal sets. Granularized locks are also applied around the fields that are accessed within code blocks represented by the superset, and the same locks are applied to code blocks represented by the subsets, thereof.

15 Claims, 4 Drawing Sheets

IDENTIFYING LOCK GRANULARIZATION OPPORTUNITIES

BACKGROUND

The present invention relates, in general, to multithreaded programming, and more specifically to identifying lock granularization opportunities using static analysis.

Some programming languages, such as, for example, java, provide for multi-threaded programming. This is exploited by most application development projects. Due to the introduction of multi-threading, an application developer must anticipate concurrent access to shared data. In order to make code thread-safe, it is common to synchronize all the instance methods on the "this" object (i.e., the "current" object, the one whose method is being executed). Several instance methods may exist which need to be synchronized as they access different sets of variables in different methods, which (though technically correct) can lead to bottlenecks as the application is scaled up. As an example, the following scenario will result in contention issues when the application is scaled up:

```
code block:
public class Connection {
....
....
private long F1;
private int F2;
....
....
public void updateTimeStamp( ) {
long uses, switches, maxUses, maxSwitches;
....
/* Start of Code block B1 */
synchronized(this) { // LOCKED ON CONNECTION instance, POSSIBLE BOTTLENECK
    if (uses != this.F1) {
        switches = ++(this.F2);
    }
    uses = ++(this.F1);
} //end of synchronization code block
/* End of Code block B1 */
....
} // end of updateTimeStamp method
} // public class Connection
```

The consequence of instance level locking is contention (threads will be held up from executing a piece of code due to the lock being held). The above code (synchronized on Connection object) will result in contention with numerous threads waiting for the Connection instance with the current thread executing the updateTimeStamp function. This problem can be seen when the application is scaled up to run on a multi-processor/core machine, such as an eight-way quad core machine.

As shown above, the piece of code where the variables F1 and F2 are accessed is synchronized on the Connection object. The Connection class also has more methods that have code synchronized on the 'this' object which do not access either F1 or F2. Therefore, locking on the Connection instance is inefficient as it blocks all other operations on the Connection object leading to a scalability bottleneck. Additionally, already existing applications may not have been developed with a futuristic view of scaling up. In an era of multi-cores, existing code may need to be rewritten to match the demands of increased loads due to scaling up the hardware.

BRIEF SUMMARY

In accordance with an embodiment of the present invention, a computer implemented method for identifying lock granularization opportunities in computer code is provided. Data is generated with a processor, comprising synchronized code blocks and fields accessed in each code block, wherein each of the code blocks and the fields they access are represented by a set. A list is generated with the processor of any non-intersecting synchronized code blocks, wherein the non-intersecting synchronized code blocks have no commonly accessed fields. Locks are then granularized directly around fields that are accessed within code blocks represented by the non-intersecting sets.

In accordance with an embodiment of the present invention, a computer system is provided for identifying lock granularization opportunities in computer code. A processor is programmed to generate data comprising synchronized code blocks and fields accessed for each code block, wherein each of the code blocks and the fields they access are represented by a set. A list of non-intersecting synchronized code blocks is generated, wherein the non-intersecting synchronized code blocks have no commonly accessed fields. Locks are granularized directly around fields that are accessed within code blocks represented by the non-intersecting sets.

In accordance with an embodiment of the present invention, a computer program product identifies lock granularization opportunities in computer code. The computer program product comprises a computer readable storage medium having computer readable program code embodied therewith configured to generate data comprising synchronized code blocks and fields accessed in each code block. Each of the code blocks and the fields they access are represented by a set. Computer readable program code is configured to generate a list of non-intersecting synchronized code blocks, wherein the non-intersecting synchronized code blocks have no commonly accessed fields. Computer readable program code is configured to granularize locks directly around fields that are accessed within code blocks represented by the non-intersecting sets.

DETAILED DESCRIPTION

Figure 1:
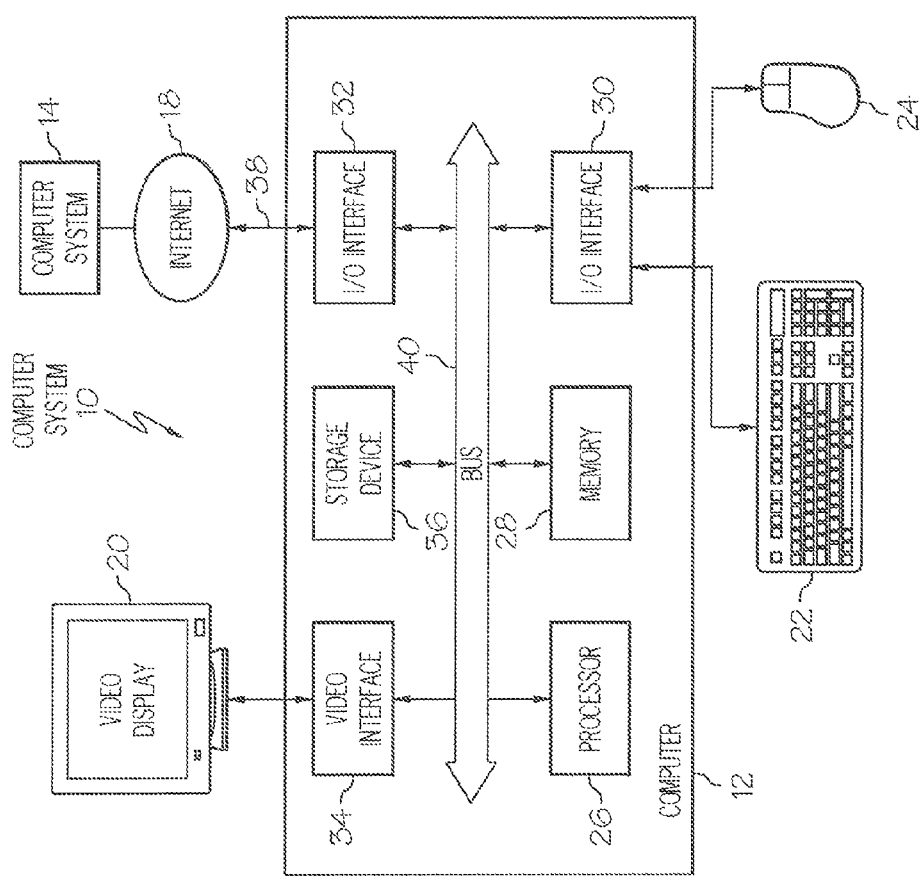
FIG. 1 illustrates a hardware system that implements an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to, wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or flow block diagrams of methods, apparatus (systems) and computer program products according to embodiments of the invention. It will be understood that each flow block of the flowchart illustrations and/or flow block diagrams, and combinations of flow blocks in the flowchart illustrations and/or flow block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or flow block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or flow block diagram.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or flow block diagram.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or flow block diagram.

The flowchart and flow block diagrams in the Figures illustrate the architecture, functionality, and operation of possible implementations of systems, methods and computer program products according to various embodiments of the present invention. In this regard, each flow block in the flowchart or flow block diagrams may represent a module, segment, or portion of code, which comprises one or more executable instructions for implementing the specified logical function(s). It should also be noted that, in some alternative implementations, the functions noted in the flow block may occur out of the order noted in the figures. For example, two flow blocks shown in succession may, in fact, be executed substantially concurrently, or the flow blocks may sometimes be executed in the reverse order, depending upon the functionality involved. It will also be noted that each flow block of the flow block diagrams and/or flowchart illustration, and combinations of flow blocks in the flow block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is an illustration of a computer system 10 suitable for executing computer software for propagation of software features through networks in accordance with the techniques described. Other processing devices which may be suitable for executing the software can be a wireless telephone, personal assistant device (PDA), portable computer, smart remote control device, or any other processing devices that can execute such software.

The computer system 10 is of a type that executes under a suitable operating system installed on the computer system 10, and may be thought of as comprising software code for efficiently controlling propagation of software features in a peer-to-peer messaging system. The components of the computer system 10 include a first computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 are connected to an internal bus 40 that includes data, address, and control buses, to allow components of the computer 12 to communicate with each other via the bus 40. The first computer 12 can be connected to one or more other similar computers, such as, second computer 14, via an input/output (I/O) interface 32 using a communication channel 38 to a network 18.

The computer software may be recorded on a computer readable storage medium, in which case, the computer software program is accessed by the first computer system 10 from the storage device 36. Alternatively, the computer software can be accessed directly from the network 18 by the computer 12. In either case, a user can interact with the computer 12 using the keyboard 22 and mouse 24 to operate the programmed computer software executing on the computer 12.

In accordance with one embodiment of the present invention, a set of rules is generated for use by static analysis tools to identify Lock Granularization zones within the code. Lock granularization is a method for converting a single level lock into multiple fine grained locks within synchronized code blocks (zones) in the code. Rather than placing a lock on an entire block of data (thereby preventing the use of the 'complete data' by any other thread), an embodiment of the present invention can identify a smaller amount of data, such as certain constituent members (of the data) to be locked, instead of the entire data (thereby allowing use of the rest of the data members by other application threads). Rules, which will be subsequently described in greater detail in relation to the steps 1, 2 and 3 below, can be incorporated into static analysis tools such as IBM® Rational® Purify (IBM, and Rational are trademarks of IBM Corp. in the United States, other countries or both) and FindBugs™ (FindBugs is a trademark of the University of Maryland) to help application developers resolve contention issues (multiple threads trying to access the same data) in multi-threaded applications. Static analysis tools are used to discover difficult programming errors before runtime, as they may be more difficult or impossible to find at runtime. This class of tool can discover many logical and security errors in an application without executing the compiled application. Unlike dynamic analysis tools which look at the application state while it is being executed, static analysis tools do not require the application to be compiled or executed; bugs can be found by analyzing the source code directly.

One embodiment of the present invention will now be discussed with reference to the following example code containing twelve blocks (B1-B2) of code accessing fourteen fields (F1-F14) of data:

```
public class Connection {
....
....
private long F1;
private int F2;
private long F3;
private float F4;
private int F5;
....
....
....
private long F6;
private float F7;
private int F8;
private long F9;
....
....
....
private float F10;
private int F11;
private long F12;
private float F13;
private int F14;
....
....
....
public void updateTimeStamp( ) {
long uses, switches, maxUses, maxSwitches;
....
....
....
/* Start of block B1 */
synchronized(this) { // LOCKED ON CONNECTION instance, POSSIBLE BOTTLENECK
    if (uses != this.F1) {
        switches = ++(this.F2);
    }
    uses = ++(this.F1);
} //end of synchronization code block
/* End of block B1 */
```

```
....
....
....
/* Start of block B2 */
synchronized(this) { // LOCKED ON CONNECTION instance, POSSIBLE BOTTLENECK
    if (maxUses <= this.F1) {
       this.F2 = maxSwitches;
    }
} //end of synchronization code block
/* End of block B2 */
....
....
}
public void updateUses{
....
....
/* Start of block B3 */
synchronized(this) { // LOCKED ON CONNECTION instance, POSSIBLE BOTTLENECK
    ....
    ....
        if (maxSwitches > this.F3) {
           this.F3 = maxUses;
        }
} //end of synchronization code block
/* End of block B3 */
....
....
....
....
}
public void updateSwitches{
....
....
....
....
/* Start of block B4 */
synchronized(this) { // LOCKED ON CONNECTION instance, POSSIBLE BOTTLENECK
    ....
    ....
        if (maxUses > this.F4) {
           this.F4 = maxSwitches;
        }
    ....
    ....
} //end of synchronization code block
/* End of block B4 */
....
....
....
....
....
}
public long considerForCurrentThread( ) {
....
....
....
....
long recentUsesByOtherThreads = 0;
long recentThreadSwitches = 0;
/* Start of block B5 */
synchronized (this) { // LOCKED ON CONNECTION instance, POSSIBLE
BOTTLENECK
    ....
    ....
        recentUsesByOtherThreads += this.F4;
           if (recentUsesByOtherThreads == 0) {
              this.F6 = recentThreadSwitches;
              return Long.MAX_VALUE;
           }
           recentThreadSwitches = this.F5;
           this.F6 = recentThreadSwitches;
} //end of synchronization code block
/* End of block B5 */
....
....
}
```

```
public long updateWithCurrentThreadInfo{
....
....
....
....
/* Start of block B6 */
synchronized(this) { // LOCKED ON CONNECTION instance, POSSIBLE BOTTLENECK
....
....
        this.F4 = recentUsesByOtherThreads;
....
....
} //end of synchronization code block
/* End of block B6 */
....
....
....
....
....
}
public void updateSwitchesWithCurrentInfo{
....
....
....
....
/* Start of block B7 */
synchronized(this) { // LOCKED ON CONNECTION instance, POSSIBLE BOTTLENECK
....
....
        this.F5 = recentThreadSwitches;
....
....
} //end of synchronization code block
/* End of block B7 */
....
....
....
/* Start of block B8 */
synchronized(this) { // LOCKED ON CONNECTION instance, POSSIBLE BOTTLENECK
....
....
        this.F6 = recentThreadSwitches;
....
....
} //end of synchronization code block
/* End of block B8 */
....
....
}
public void updateAllStats{
....
....
....
....
/* Start of block B9 */
synchronized(this) { // LOCKED ON CONNECTION instance, POSSIBLE BOTTLENECK
....
....
        this.F7 = stat1;
        this.F8 = stat2;
        this.F9 = stat3;
        this.F10 = stat4;
        this.F11 = stat5;
        this.F12 = stat6;
....
....
} //end of synchronization code block
/* End of block B9 */
....
....
....
....
}
```

```
/* Start of block B10 */
public synchronized void updateAccessInfo{ // LOCKED ON CONNECTION instance,
POSSIBLE BOTTLENECK
....
....
....
....
....
....
        this.F13 = timesIgnored;
        this.F12 = timesAccessed;
....
....
} //end of method & synchronization code block
/* End of block B10 */
/* Start of block B11 */
public synchronized void updateLastAccessTime{ // LOCKED ON CONNECTION
instance, POSSIBLE BOTTLENECK
        this.F14 = lastAccessTime;
} //end of method & synchronization code block
/* End of block. B11 */
/* Start of block B12 */
public synchronized void getLastAccessTime{ // LOCKED ON CONNECTION instance,
POSSIBLE BOTTLENECK
        return this.F14 ;
} //end of method & synchronization code block
/* End of block B12 */
....
....
        } // public class Connection
```

As used above: "LOCKED ON CONNECTION instance, POSSIBLE BOTTLENECK" is language added to show possible problems that an embodiment of the present invention can repair.

With the help of FIGS. 2-5, an embodiment of the present invention is shown with reference to the example code listed above. As used herein, 'code block' refers to sections of executable code and 'flow block' refers to a designation in the Figures. The present invention seeks to concentrate on each code block to identify opportunities for granular locking. Granular locking in a code block means that the lock used in that code block can be limited to be around only the fields that are accessed within the code block as opposed to locking around all the fields in an object wherever possible. This would mean that when the application accesses this code block, it locks around only the pertinent fields. Referring first to the flowchart of FIG. 2:

At flow block 200, for any given class, a list of synchronized code blocks is created along with the fields that they access. For example, the raw data for the Connection class of the example code above is:

| Code block | Fields accessed |
|---|---|
| B1 | F1, F2 |
| B2 | F1, F2 |
| B3 | F3 |
| B4 | F4 |
| B5 | F4, F5, F6 |
| B6 | F4 |
| B7 | F5 |
| B8 | F6 |
| B9 | F7, F8, F9, F10, F11, F12 |
| B10 | F12, F13 |
| B11 | F14 |
| B12 | F14 |

Each code block 'B' can be represented by a set with the fields 'F' forming the entities of the set. As represented by flow block 202 in FIG. 2 and as shown in FIG. 3, an 'm×n' matrix structure 300 is created with the code blocks forming one axis and the fields they access forming the other axis. The shaded matrix-code blocks indicate the fields accessed within each block of code.

Figure 2:
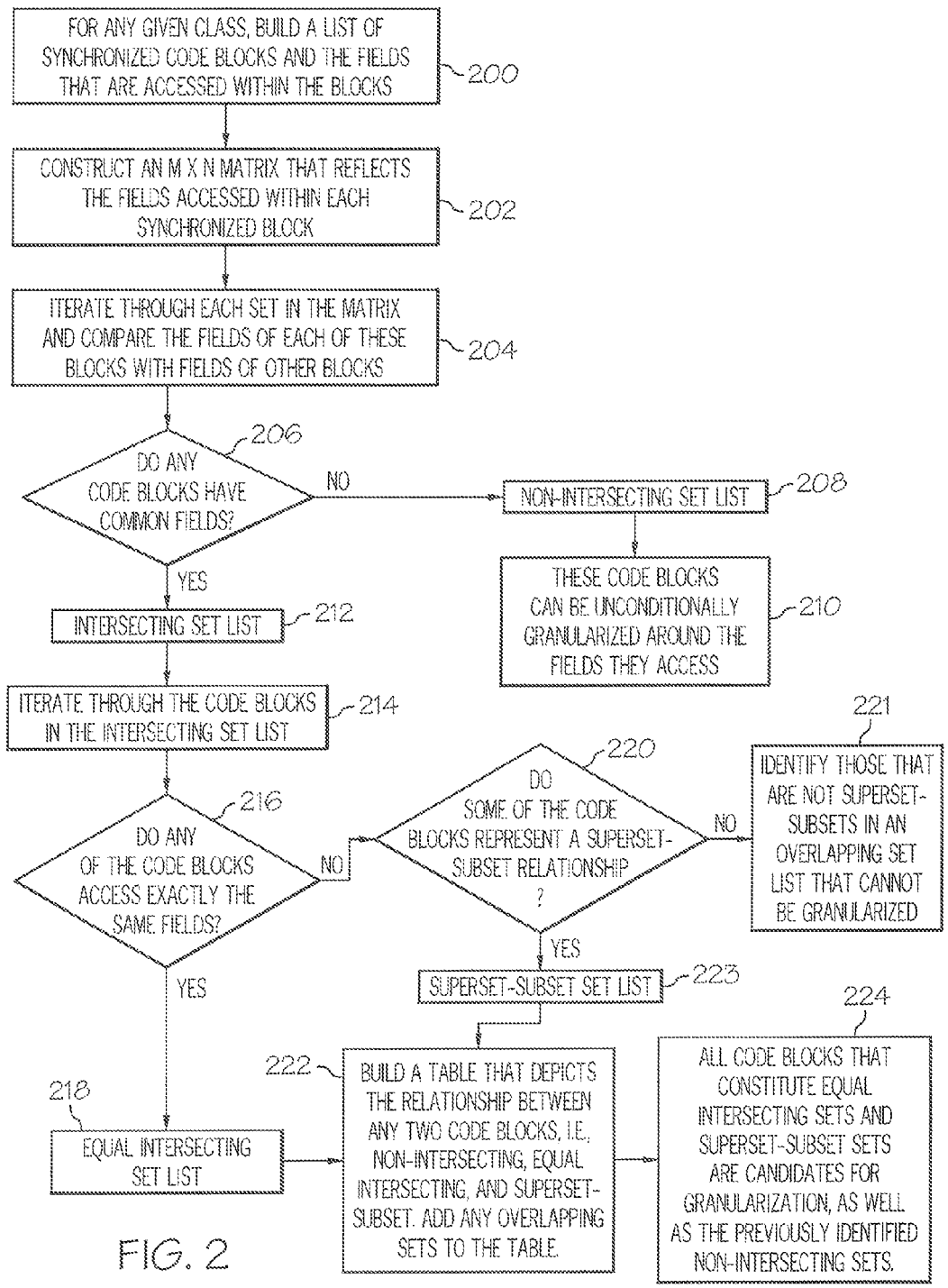
FIG. 2 is a flowchart that illustrates an embodiment of the invention.
Figure 3:
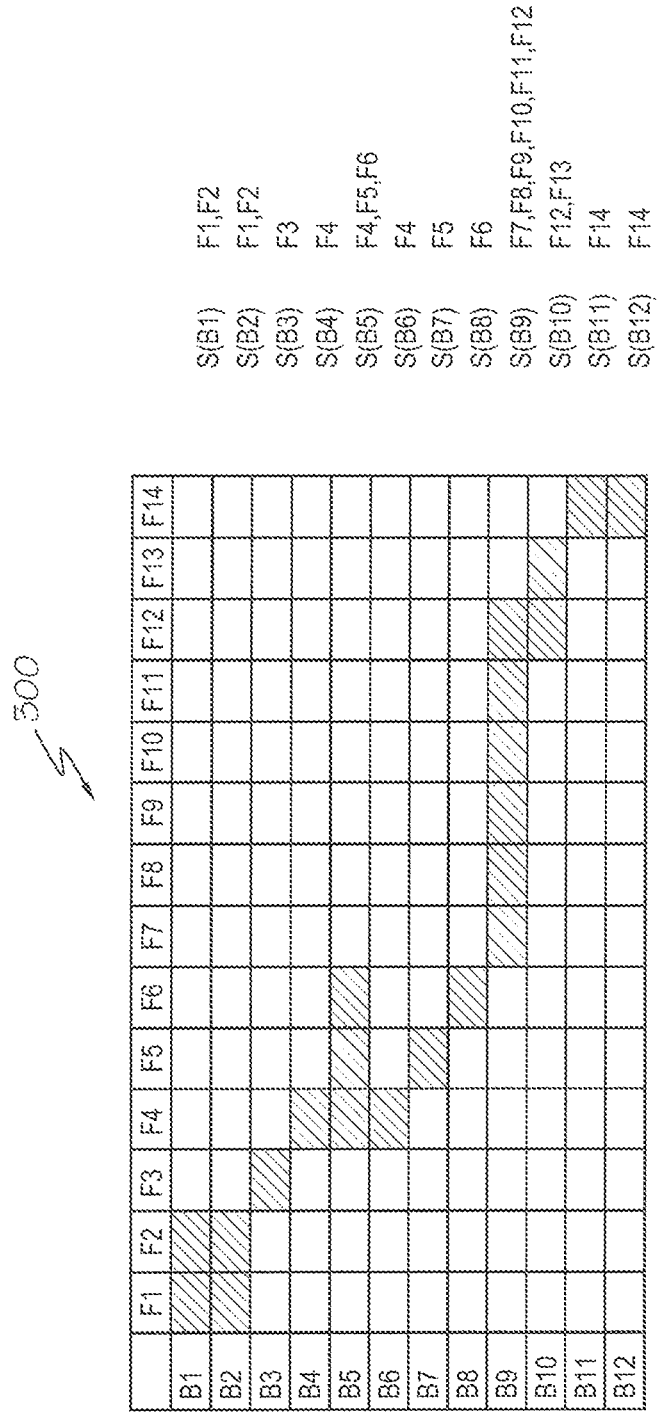
FIG. 3 is a matrix structure in accordance with an embodiment of the invention.

As identified by flow block 204 in FIG. 2, each set (representing code blocks as previously described above) is intersected with all other sets to arrive at a list of sets that have intersections. For example, starting with (set) S(B1):

intersection between S(B1) and S(B2) results in a set containing F1, F2;

intersection between S(B1) and S(B3) results in an empty set, as there are no fields in common;

intersection between S(B1) and S(B4) results in an empty set and so on, through S(B12). Similarly, the exercise is repeated for S(B2), S(B3), and so on.

Upon completion of the iteration at flow block 204 of FIG. 2, it is determined at decision flow block 206 if there are any code blocks with commonly accessed fields. If the result of decision flow block 206 is no, the code blocks are identified in a Non-intersecting List at flow block 208. These code blocks can be unconditionally granularized around the fields that they access at flow block 210.

If the result of decision flow block 206 is yes, a list of non-null intersection sets (i.e., sets that have code blocks that access some of the same fields) are isolated as Intersecting Sets into an Intersection List at flow block 212. Following the above example, the Intersection List would include the following Intersecting Sets:

S(B1), S(B2);

S(B5),S(B4),S(B6),S(B7),S(B8);

S(B4), S(B6);

S(B9),S(B10);

S(B11),S(B12)

At flow block 214, the code blocks of the Intersecting Sets are iterated through. It is determined at decision flow block 216, whether there are any code blocks that access exactly the same fields. If the response to decision flow block 216 is no, it is determined at decision flow block 220 if some of the code blocks represent a superset-subset relationship. If the response to decision flow block 220 is no, those not identified as a superset-subsets are designated as overlapping which cannot be granularized. Overlapping sets cannot be granularized because, although they have at least one commonly accessed field, neither set is a complete set of the other. Continuing with the example, the overlapping sets are:

S(B9) which accesses fields F7. F8, F9, F10, F11, and F12; and

S(B10) which accesses fields F12 and F13.

If the response to decision flow block 220 is yes, those code blocks having a superset-subset relationship are identified in a superset-subset list at flow block 223. In the continuing example, the superset-subset list would be:

S(B5), S(B4), S(B6), S(B7), S(B8), where S(B5) is the superset and S(B4), S(B6), S(B7), and S(B8) form the subsets of S(B5), i.e., every field in each subset is in the superset.

If the response to decision flow block 216 is yes, an equal intersecting set is created at flow block 218. From the intersection list of the current example, the exactly equal intersecting sets are further isolated in an EqualSet list which would include:

S(B1), S(B2) (both of which access F1,F2);
S(B4), S(B6) (both of which access F4); and
S(B11), S(B12) (both of which access F14).

Figure 4:
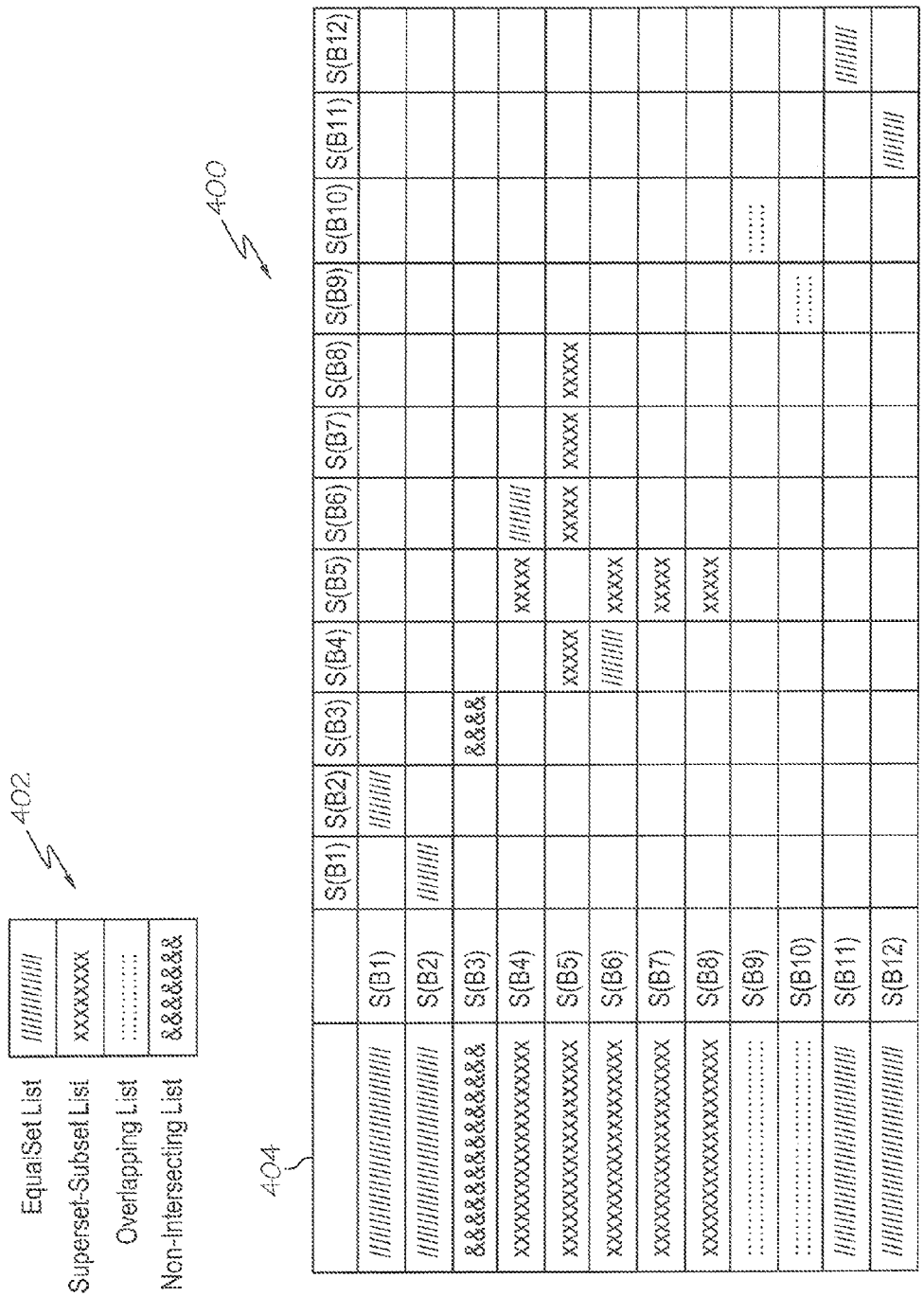
FIG. 4 is a final matrix illustrating appropriate values for each code block.

Subsequent to flow block 218 and/or 223, at flow block 222, the information thus generated is encapsulated into an 'n×n' matrix data-structure, as illustrated in FIG. 4. Both axes of the matrix represent the code blocks—S(B1),S(B2), S(B3) . . . , etc. Each piece of information, namely:

EqualSet List,
Superset-Subset List,
Overlapping List, and
Non-Intersecting List, is represented in the matrix shown as a table 400 in FIG. 4. Each row and column of the matrix is traversed. Code blocks whose rows and columns have only hashed shading (EqualSet List), ampersand shading (Non-Intersecting List), or cross-hatched shading (Superset-subset List) are candidates for granularization. Code blocks whose rows and columns have stippled shading (Overlapping List) are not candidates for granularization. In the above example, the EqualSet Lists {S(B1), S(B2)}, {S(B11), S(B12)}, and {S(B4), S(B6)}, non-intersecting list {S(B3)}, and superset-subset list {S(B5),S(B6),S(B7),S(B8),S(B4)} are candidates for lock granularization.

Thus, FIG. 2 shows the first step for lock granularization is to identify all the synchronized code blocks in the code under analysis. In the above example, all the synchronized code blocks are identified and classified based on the fields that are accessed, into EqualSet Lists, Non-Intersecting Lists, Superset-subset Lists, and Overlapping Lists. This classification eases the process of determining where to apply lock granularization. All equal intersecting sets access the same set of fields, so a granular lock encompassing those fields can be built, provided certain conditions are met (explained below). Non intersecting sets are unique code blocks whose fields are not accessed in any other code block. In the superset-subset list, supersets have more fields than their exact subsets. The terms for lock granularization must consider the superset fields for building a granular lock.

Continuing with the example above, the EqualSet List ({S(B1), S(B2)}, {S(B11), S(B12)}, and {S(B4), S(B6)}), the Non-Intersecting List ({S(B3)}), and the Superset-subset List ({S(B5),S(B6),S(B7),S(B8),S(B4)}) are candidates for lock granularization. Therefore, as shown in FIG. 4, code blocks whose rows and columns have only hashed shading, ampersand shading, or cross-hatched shading are candidates for granularization. Depending on the classification of the code blocks, the rules of granularization will vary. A key 402 for defining the sets is shown in FIG. 4.

If a Row or Column of the matrix has ampersand shading (a non-intersection set), then the code block corresponding to that row or column can be granularized around the fields that are accessed within those code blocks because no other code blocks access those same fields.

If a Row or Column of the matrix has cross-hatched shading (superset-subset), preference is given over the hashed areas in that row or column. For example, as shown in FIG. 4, although S(B4) is equal to S(B6), both are also subsets of S(B5). Hence, the superset-subset relationship must take precedence over the equal relationship. If two or more sets are equal to each other, but are also subsets of another set (consequently the superset), then the granularization should be done around the fields of the superset for all those sets because the fields of the superset represent the minimum number of fields that need to be locked. Granularizing a lock around the fields of the subsets would mean that the superset cannot be covered, as it would apparently access more fields than the subsets, which would be incorrect synchronization. Therefore, the set {S(B4), S(B5), S(B6), S(B7), S(B8)} is a candidate for granularization, not just the set {S(B4), S(B6)}.

A final structure is created with the appropriate values for every code block derived is shown at column 404 in the matrix data-structure 400. The final structure clearly indicates that S(B1), S(B2), S(B3), S(B4), S(B5), S(B6), S(B7), S(B8), S(B11), S(B12) can be granularized.

To better understand the fields that need to be granularized for each code block, the matrix shown in FIG. 3 and defined in FIG. 2 can be re-referenced. For example, S(B1), S(B2) would be granularized around F1, F2, and S(B11), S(B12) would be granularized around F14. For Non-equal Intersecting sets, the superset-subset information is made use of to derive the granularization level.

In Summary, the rules to apply are:

Generate data of synchronized code blocks and accessed fields for each code block. Each of these code blocks is represented by a set.

Generate a list of intersecting and non-intersecting synchronized code blocks.

Non-intersecting sets are granularized directly around the fields that are accessed within the code blocks From within the list of Intersecting synchronized code blocks, generate a list of equal and superset-subset lists.

Equal intersecting synchronized code blocks can be granularized directly around the fields that are accessed within, provided these sets are not intersecting with other sets.

For the superset-subset synchronized code blocks, the following rule needs to be applied for granularization: granularization is always done around the fields of the superset and applied to the superset and the subsets. For example, S(B5) is the superset and has the fields F4, F5, F6, so a granularized lock around fields F4, F5, F6 is applied for S(B5), S(B6), S(B7), S(B8), and S(B4).

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method for identifying lock granularization opportunities in computer code, comprising:
    generating data, with a processor, comprising synchronized code blocks and fields accessed in each code block, wherein each of said code blocks and the fields they access are represented by a set;
    generating a list with said processor of any non-intersecting synchronized code blocks, wherein said non-intersecting synchronized code blocks have no commonly accessed fields;
    granularizing locks directly around fields that are accessed within code blocks represented by non-intersecting sets;
    generating a list with said processor of any intersecting synchronized code blocks, wherein said intersecting synchronized code blocks have at least one commonly accessed field;
    generating a list with said processor of any overlapping sets from the list of intersecting synchronized code blocks, wherein said overlapping sets have at least one commonly accessed field but no set is a complete subset of another; and
    identifying fields that are accessed within code blocks represented by any overlapping sets as ineligible for granularized locking.

2. The method of claim 1, further comprising:
    generating a list with said processor of any equal sets from the list of intersecting synchronized code blocks; and
    granularizing locks around the fields that are accessed within code blocks represented by equal sets.

3. The method of claim 1, further comprising:
    generating a list with said processor of any superset-subset sets from the list of intersecting synchronized code blocks, wherein every field in each subset is also in the superset; and
    granularizing locks around the fields that are accessed within code blocks represented by the superset and applying the same locks to code blocks represented by the subsets, thereof.

4. The method of claim 1, further comprising:
    generating a list with said processor of any equal sets from the list of intersecting synchronized code blocks;
    granularizing locks around the fields that are accessed within code blocks represented by equal sets;
    generating a list with said processor of any superset-subset sets from the list of intersecting synchronized code blocks, wherein every field in each subset is also in the superset; and
    granularizing locks around the fields that are accessed within code blocks represented by the superset and applying the same locks to code blocks represented by the subsets, thereof.

5. The method of claim 4, wherein if two sets are equal, but are also subsets of a third superset, granularization of the superset-subset set takes precedence over granularization of the equal sets.

6. A computer system for identifying lock granularization opportunities in computer code, comprising:
    a hardware processor; and
    memory connected to the processor, wherein the memory is encoded with instructions and wherein the instructions when executed comprise:
    instructions for generating data comprising synchronized code blocks and fields accessed for each code block, wherein each of said code blocks and the fields they access are represented by a set;
    instructions for generating a list of non-intersecting synchronized code blocks, wherein said non-intersecting synchronized code blocks have no commonly accessed fields;
    instructions for granularizing locks directly around fields that are accessed within code blocks represented by non-intersecting sets;
    instructions for generating a list of any intersecting synchronized code blocks, wherein said intersecting synchronized code blocks have at least one commonly accessed field;
    instructions for generating a list of any overlapping sets from the list of intersecting synchronized code blocks, wherein said overlapping sets have at least one commonly accessed field, but no set is a complete subset of another; and
    instructions for identifying fields that are accessed within code blocks represented by any overlapping sets as ineligible for granularized locking.

7. The system of claim 6, further comprising:
    instructions for generating a list of equal sets from the list of intersecting synchronized code blocks; and
    instructions for granularizing directly around the fields that are accessed within code blocks represented by equal sets.

8. The system of claim 6, further comprising:
    instructions for generating a list of superset-subset sets from the list of intersecting synchronized code blocks, wherein every field in each subset is also in the superset; and
    instructions for granularizing locks around the fields that are accessed within code blocks represented by the superset and apply the same locks to code blocks represented by the subsets, thereof.

9. The system of claim 6, further comprising:
    instructions for generating a list of any equal sets from the list of intersecting synchronized code blocks;
    instructions for granularizing locks around the fields that are accessed within code blocks represented by equal sets;
    instructions for generating a list of any superset-subset sets from the list of intersecting synchronized code blocks, wherein every field in each subset is also in the superset; and
    instructions for granularizing locks around the fields that are accessed within code blocks represented by the superset and apply the same locks to code blocks represented by the subsets, thereof.

10. The system of claim 9, wherein if two sets are equal, but are also subsets of a third superset, granularization of the superset-subset set takes precedence over granularization of the equal sets.

11. A computer program product for identifying lock granularization opportunities in computer code, the computer program product comprising a computer readable hardware storage device having computer readable program code embodied therewith, the computer readable program code comprising:

- computer readable program code configured to generate data comprising synchronized code blocks and fields accessed in each code block, wherein each of said code blocks and the fields they access are represented by a set;
- computer readable program code configured to generate a list of non-intersecting synchronized code blocks, wherein said non-intersecting synchronized code blocks have no commonly accessed fields;
- computer readable program code configured to granularize locks directly around fields that are accessed within code blocks represented by non-intersecting sets;
- computer readable program code configured to generate a list of any intersecting synchronized code blocks, wherein said intersecting synchronized code blocks have at least one commonly accessed field;
- computer readable program code configured to generate a list of any overlapping sets from the list of intersecting synchronized code blocks, wherein said overlapping sets have at least one commonly accessed field, but no set is a complete subset of another; and
- computer readable program code configured to identify fields that are accessed within code blocks represented by any overlapping sets as ineligible for granularized locking.

12. The computer program product of claim 11, further comprising:

- computer readable program code configured to generate a list of equal sets from the list of intersecting synchronized code blocks; and
- computer readable program code configured to granularize directly around the fields that are accessed within code blocks represented by equal sets.

13. The computer program product of claim 11, further comprising:

- computer readable program code configured to generate a list of superset-subset sets from the list of intersecting synchronized code blocks, wherein every field in each subset is also in the superset; and
- computer readable program code configured to granularize locks around the fields that are accessed within code blocks represented by the superset and apply the same locks to code blocks represented by the subsets, thereof.

14. The computer program product of claim 11, further comprising:

- computer readable program code configured to generate a list of any equal sets from the list of intersecting synchronized code blocks;
- computer readable program code configured to granularize locks around the fields that are accessed within code blocks represented by equal sets;
- computer readable program code configured to generate a list of any superset-subset sets from the list of intersecting synchronized code blocks, wherein every field in each subset is also in the superset; and
- computer readable program code configured to granularize locks around the fields that are accessed within code blocks represented by the superset and apply the same locks to code blocks represented by the subsets, thereof.

15. The computer program product of claim 14, wherein if two sets are equal, but are also subsets of a third superset, granularization of the superset-subset set takes precedence over granularization of the equal sets.

* * * * *